US009197705B2

(12) United States Patent
Lee et al.

(10) Patent No.: US 9,197,705 B2
(45) Date of Patent: Nov. 24, 2015

(54) METHOD AND APPARATUS FOR SUPPORTING DRIVING USING WIRELESS COMMUNICATION NETWORK AND SYSTEM THEREOF

(71) Applicant: Samsung Electronics Co., Ltd., Suwon-si, Gyeonggi-do (KR)

(72) Inventors: Jeong-Ho Lee, Suwon-si (KR); Il-Won Kwon, Seoul (KR); Seung-Bo Ryu, Yongin-si (KR); Hee-Kwang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/250,985

(22) Filed: Apr. 11, 2014

(65) Prior Publication Data
US 2014/0309812 A1    Oct. 16, 2014

(30) Foreign Application Priority Data

Apr. 12, 2013    (KR) .................. 10-2013-0040679

(51) Int. Cl.
*B60W 50/00*    (2006.01)
*H04L 29/08*    (2006.01)
*B60W 50/14*    (2012.01)

(52) U.S. Cl.
CPC ............... *H04L 67/12* (2013.01); *B60W 50/14* (2013.01); *B60W 2050/146* (2013.01); *B60W 2550/40* (2013.01)

(58) Field of Classification Search
USPC .............................................. 701/2
See application file for complete search history.

(56) References Cited

U.S. PATENT DOCUMENTS

| 6,199,013 B1* | 3/2001 | O'Shea ..................... 701/431 |
| 6,253,146 B1* | 6/2001 | Hanson et al. ............... 701/414 |
| 6,812,888 B2* | 11/2004 | Drury et al. ............. 342/357.31 |
| 7,161,504 B2* | 1/2007 | Linn ...................... 340/995.13 |
| 7,817,550 B2* | 10/2010 | Sultan et al. ................. 370/232 |
| 8,452,483 B2* | 5/2013 | Kim et al. ................... 701/31.4 |
| 8,626,436 B2* | 1/2014 | Gutman ...................... 701/408 |
| 8,738,197 B2* | 5/2014 | An et al. .......................... 701/2 |
| 8,738,284 B1* | 5/2014 | Jones ............................ 701/409 |

(Continued)

FOREIGN PATENT DOCUMENTS

| KR | 10-2010-0004326 A | 1/2010 |
| KR | 10-1096376 B1 | 12/2011 |

(Continued)

*Primary Examiner* — Thomas Tarcza
*Assistant Examiner* — Alex C Dunn
(74) *Attorney, Agent, or Firm* — Jefferson IP Law, LLP

(57) ABSTRACT

A method of allowing a local Driving Assistance Service (DAS) center within a base station to provide a DAS to a vehicle by using a communication network is provided. The method includes receiving, from a vehicle terminal, local DAS information and surrounding information of the vehicle, generating Analyzed-local (A-local) DAS information by using the received local DAS information, and transmitting, when the DAS is provided by using the generated A-local DAS information, the A-local DAS information to the vehicle terminal.

41 Claims, 11 Drawing Sheets

(56) References Cited

U.S. PATENT DOCUMENTS

| | | | |
|---|---|---|---|
| 2006/0014531 A1* | 1/2006 | Nam et al. | 455/418 |
| 2008/0248813 A1* | 10/2008 | Chatterjee | 455/456.2 |
| 2010/0274435 A1* | 10/2010 | Kondoh et al. | 701/29 |
| 2011/0130916 A1* | 6/2011 | Mayer | 701/33 |
| 2011/0130918 A1* | 6/2011 | Kim et al. | 701/33 |
| 2011/0208387 A1* | 8/2011 | Bosch et al. | 701/35 |
| 2011/0288765 A1* | 11/2011 | Conway | 701/201 |
| 2013/0325284 A1* | 12/2013 | Sato | 701/96 |
| 2013/0325306 A1* | 12/2013 | Caveney et al. | 701/117 |
| 2014/0005880 A1* | 1/2014 | Guenkova-Luy et al. | 701/31.4 |
| 2014/0025292 A1* | 1/2014 | Stahlin et al. | 701/461 |

FOREIGN PATENT DOCUMENTS

| | | |
|---|---|---|
| KR | 10-2012-0063389 A | 6/2012 |
| KR | 10-1220809 B1 | 1/2013 |
| KR | 10-1221374 B1 | 1/2013 |

* cited by examiner

METHOD AND APPARATUS FOR SUPPORTING DRIVING USING WIRELESS COMMUNICATION NETWORK AND SYSTEM THEREOF

CROSS-REFERENCE TO RELATED APPLICATION(S)

This application claims the benefit under 35 U.S.C. §119(a) of a Korean patent application filed on Apr. 12, 2013 in the Korean Intellectual Property Office and assigned Serial number 10-2013-0040679, the entire disclosure of which is hereby incorporated by reference.

TECHNICAL FIELD

The present disclosure relates to a method and an apparatus for supporting driving using a wireless communication network, and a system thereof.

BACKGROUND

Currently, apparatuses for convenience and safety of a driver, such as a navigation device, a black box, and the like, are widely used. Such apparatuses are used for improving the convenience and safety of driving by providing, to a driver, various pieces of information needed for driving.

However, a locational range with which such apparatuses may monitor surroundings and information for the convenience of driving which such apparatuses may provide to a driver are limited. For example, since the black box may perform photography only within a visible range of a camera and the navigation device may provide only information on a current road situation which has been previously generated, the accuracy of these apparatuses is limited. Further, there are apparatuses added to a vehicle in order to increase driving safety of a driver, for example, a Lane Departure Warning System (LDWS) warns of only danger to the driver's vehicle. Thus, the apparatuses may not anticipate how an entire road situation or a future road situation changes, or may not warn of danger from other vehicles. Thus, an accuracy of the information or a safety provided to the driver is limited.

Accordingly, a system and method for providing optimal driving assistance information to the driver by managing and analyzing driving information of a vehicle, driving information of surrounding vehicles, and information on an entire road situation through network is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide convenience and safety of driving to a driver by providing optimal driving assistance information to the driver by managing and analyzing driving information of a vehicle, driving information of surrounding vehicles, and information on an entire road situation through network.

Another aspect of the present disclosure is to provide danger information to the driver by anticipating a dangerous situation by using driving assistance information considering a vehicle, a road, and a surrounding situation through a communication network.

Another aspect of the present disclosure is to provide navigation information and black box information through the communication network and provides the information to the driver.

Another aspect of the present disclosure is to provide a remote driving service to the driver by collecting emergency situation information of a vehicle through the communication network.

Another aspect of the present disclosure is to provide a battery charging state of a vehicle through the communication network and provides a proper charging service to a vehicle being driven.

In accordance with an aspect of the present disclosure, a method of allowing a local Driving Assistance Service (DAS) center to provide a DAS to a vehicle by using a communication network is provided. The method includes receiving, from a vehicle terminal, local DAS information including at least one of driving information of the vehicle and surrounding information of the vehicle, generating Analyzed-local (A-local) DAS information by using the received local DAS information, and transmitting, when the DAS is provided by using the generated A-local DAS information, the generated A-local DAS information to the vehicle terminal.

In accordance with another aspect of the present disclosure, a method of allowing a broad Driving Assistance Service (DAS) center to provide a DAS by using a communication network is provided. The method includes receiving, from a local DAS center, Analyzed-local (A-local) DAS information generated from local DAS information of a vehicle terminal, generating integrated DAS information by using the A-local DAS information and broad DAS information within the broad DAS center, and transmitting the generated integrated DAS information to the local DAS center.

In accordance with another aspect of the present disclosure, a method of allowing a vehicle including a local Driving Assistance Service (DAS) terminal to receive a DAS by using a communication network is provided. The method includes collecting local DAS information including at least one of driving information of the vehicle and surrounding information of the vehicle, transmitting the collected local DAS information to a local DAS center, receiving, from the local DAS center, control information generated by using the local DAS information, and controlling driving of the vehicle according to the control information.

In accordance with another aspect of the present disclosure, a local Driving Assistance Service (DAS) center device for providing a DAS to a vehicle by using a communication network is provided. The local DAS center device includes a transmission/reception unit configured to receive, from a vehicle terminal, local DAS information including at least one of driving information of the vehicle and surrounding information of the vehicle, a DAS information processing unit configured to generate A-local DAS information by using the received local DAS information, a controller configured to, when the DAS is provided by using the generated A-local DAS information, transmit, to the vehicle terminal, the generated A-local DAS information through the transmission/reception unit.

In accordance with another aspect of the present disclosure, a broad Driving Assistance Service (DAS) center device for providing a DAS by using a communication network is provided. The broad DAS center device includes a transmission/reception unit configured to receive, from a local DAS center, Analyzed-local (A-local) DAS information generated from local DAS information of a vehicle terminal, a DAS information processing unit configured to generate integrated DAS information by using the A-local DAS information and broad DAS information within the broad DAS center, and to transmit the generated integrated DAS information to the local DAS center.

In accordance with another aspect of the present disclosure, a local Driving Assistance Service (DAS) terminal device within a vehicle to receive a DAS provided using a communication network is provided. The local DAS terminal device includes a local DAS information collection unit configured to collect local DAS information including at least one of driving information of the vehicle and surrounding information of the vehicle, a transmission/reception unit configured to transmit the collected local DAS information to a local DAS center, and to receive control information generated by using the local DAS information, and a controller configured to control driving of the vehicle according to the control information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
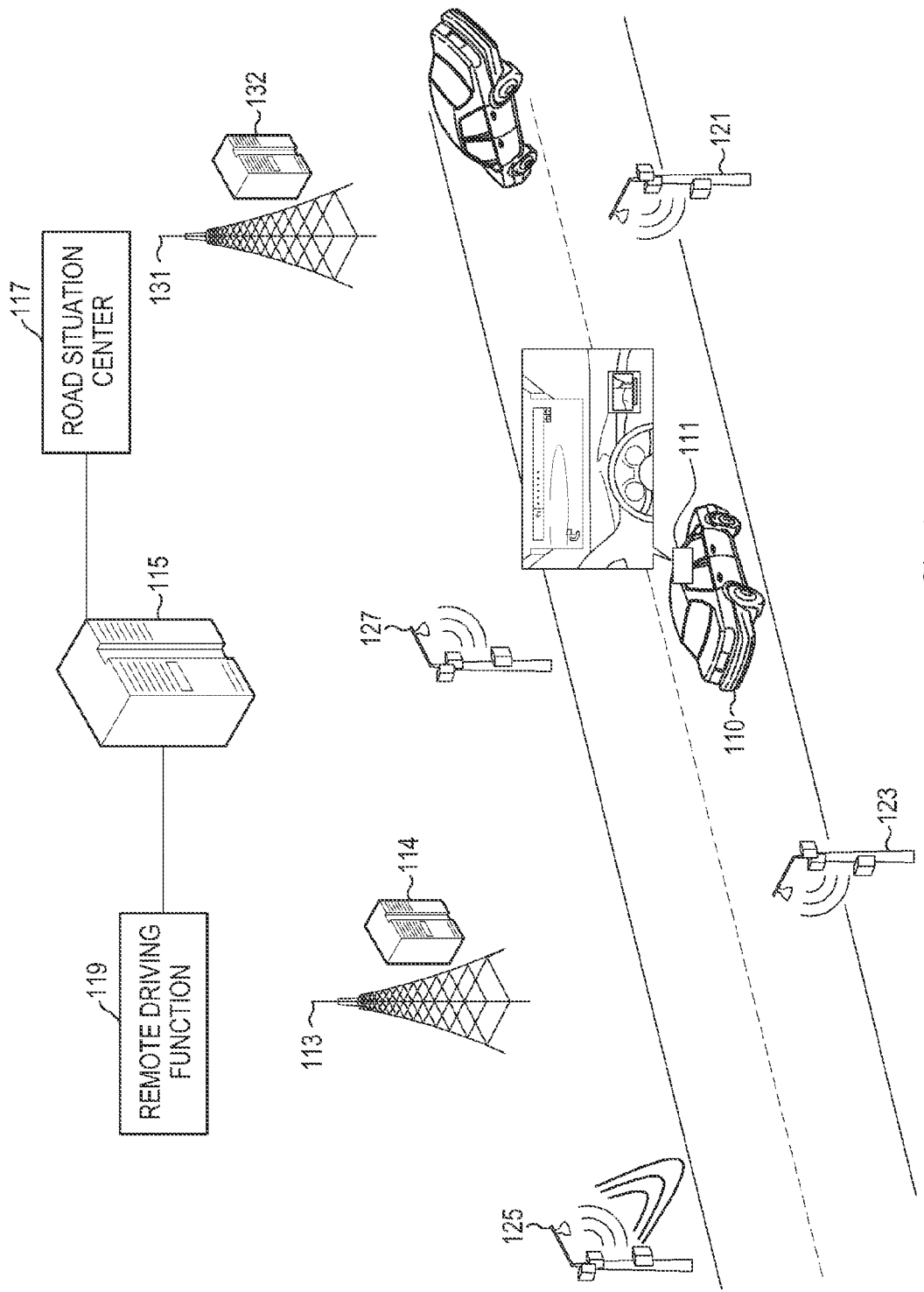
FIG. 1 illustrates a system configuration for a driving assistance service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A basic concept of the various embodiments of the present disclosure is to provide driving information about a vehicle being driven to a communication network, analyze the driving information of the vehicle and additional information (e.g., road information, and the like) needed for driving the vehicle by the communication network, and then provide the analyzed information to the vehicle being driven, so as to provide a service such as safe driving of the corresponding vehicle, a navigation service, a black box service, an emergency driving in an emergency situation, wireless electric power management for the vehicle, and the like. In detail, a local Driving Assistance Service (DAS) center 114, which has received local DAS information about a vehicle and/or surroundings of the vehicle through a terminal of the corresponding vehicle, may generate information for other vehicles of the corresponding base station by analyzing/processing/selecting the DAS information, and may provide the generated information to the other vehicles. Further, the local DAS center 114 generates Analyzed-local DAS (A-local DAS) information and provide the generated information to a broad DAS center 115, and the broad DAS center 115 generates integrated DAS information by analyzing the A-local DAS information of the corresponding vehicle and broad DAS information gathered by itself or from the outside, and then transmits the integrated DAS information to the local DAS center 114. The local DAS center 114 may generate Analyzed-integrated DAS (A-integrated DAS) information in accordance with characteristics of each terminal by analyzing/processing/selecting the integrated DAS information, and transmit the generated A-integrated DAS information to a vehicle terminal 111 in each of vehicles within a coverage area of the corresponding base station, so as to provide information needed for driving the corresponding vehicle or control the vehicle.

On the basis of the concept of the embodiments of the present disclosure, the embodiments of the present disclosure proposes a safety connection service, an intelligent navigation service, a black box service, an emergency remote driving service and a wireless charging service, which are provided for safe driving of a vehicle.

FIG. 1 illustrates a system configuration for a driving assistance service according to an embodiment of the present disclosure.

Referring to FIG. 1, a system (hereinafter, referred to as a "DAS system") for a driving assistance service according to an embodiment of the present disclosure includes a vehicle 110, a vehicle terminal 111, a base station 113, a local DAS center 114 and a broad DAS center 115. Further, the DAS system may further include a road situation center 117, a remote driving function 119 and roadside base stations 121 to 127. Although the roadside base stations 121, 123, 125 and 127 are expressed on the figure as separate function blocks separated from the base station 113, the roadside base stations 121, 123, 125 and 127 may be actually configured as RF blocks which correspond to one type of component of the base station 113.

The vehicle 110 being driven includes the vehicle terminal 111 which supports the DAS according to an embodiment of the present disclosure. The vehicle terminal 111 may gather various pieces of local DAS information and wirelessly transmit/receive the DAS information through a network, and includes a means (e.g. a heads-up display) for providing, to a driver, various pieces of information in a form of audio and/or video. The vehicle terminal 111 gathers and/or generates the local DAS information which is information relating to driving of the vehicle 110, and transmits the gathered and/or generated local DAS information to the local DAS center 114 within the base station 113. The local DAS center 114 may be located within the base station 113 and may exist as one function block or as being physically separated. However, hereinafter, for convenience of description, it is assumed that the local DAS center 114 exists with the base station 113. Further, the base station 113 performs a function of transmitting/receiving wireless data, and the local DAS center 114 performs a function of analyzing or processing the DAS information. Since the base station 113 has a limited coverage, there is a base station 113/local DAS center 114 which is in charge of each area. Each base station 113/local DAS center 114 may receive the local DAS information of vehicles within the corresponding coverage, generate A-local DAS information through analyzing/processing/selecting the received local DAS information, transmit the generated A-local DAS information to the broad DAS center 115, and then exchange information with the broad DAS center 115.

The broad DAS center 115 generates integrated DAS information by analyzing the A-local DAS information and broad DAS information gathered by itself or from the outside together. The broad DAS center 115 transmits the integrated DAS information to the local DAS center 114 of each of the base stations 113 and/or the local DAS center 132 of each of the base stations 131. The local DAS center 114 generates A-integrated DAS information for the corresponding terminal by analyzing/processing/selecting the integrated DAS information and provides the generated A-integrated DAS information to the vehicle terminal 111.

If necessary, the local DAS center 114 may transmit the integrated DAS information to the road situation center 117 and/or to the remote driving function 119. The road situation center 117 performs an operation according to a road situation by analyzing the integrated DAS information or performs an operation according to a request/command which may be included in the integrated DAS information. In this case, the operation performed by the road situation center 117 may be changed according to the integrated DAS information or according to the request/command included in the integrated DAS information. The detailed operation will be described below. The remote driving function 119 performs a remote driving control operation with respect to a vehicle supporting remote driving according to an embodiment of the present disclosure, and a detailed description of the remote driving control operation will be described below. Further, the roadside base stations 121, 123, 125 and 127 may be used for providing a wireless charging service according to an embodiment of the present disclosure, and a description thereof will be described below. However, in some cases, the roadside base stations 121, 123, 125 and 127 may perform a function of the base station 113 and the local DAS center 114.

Figure 2:
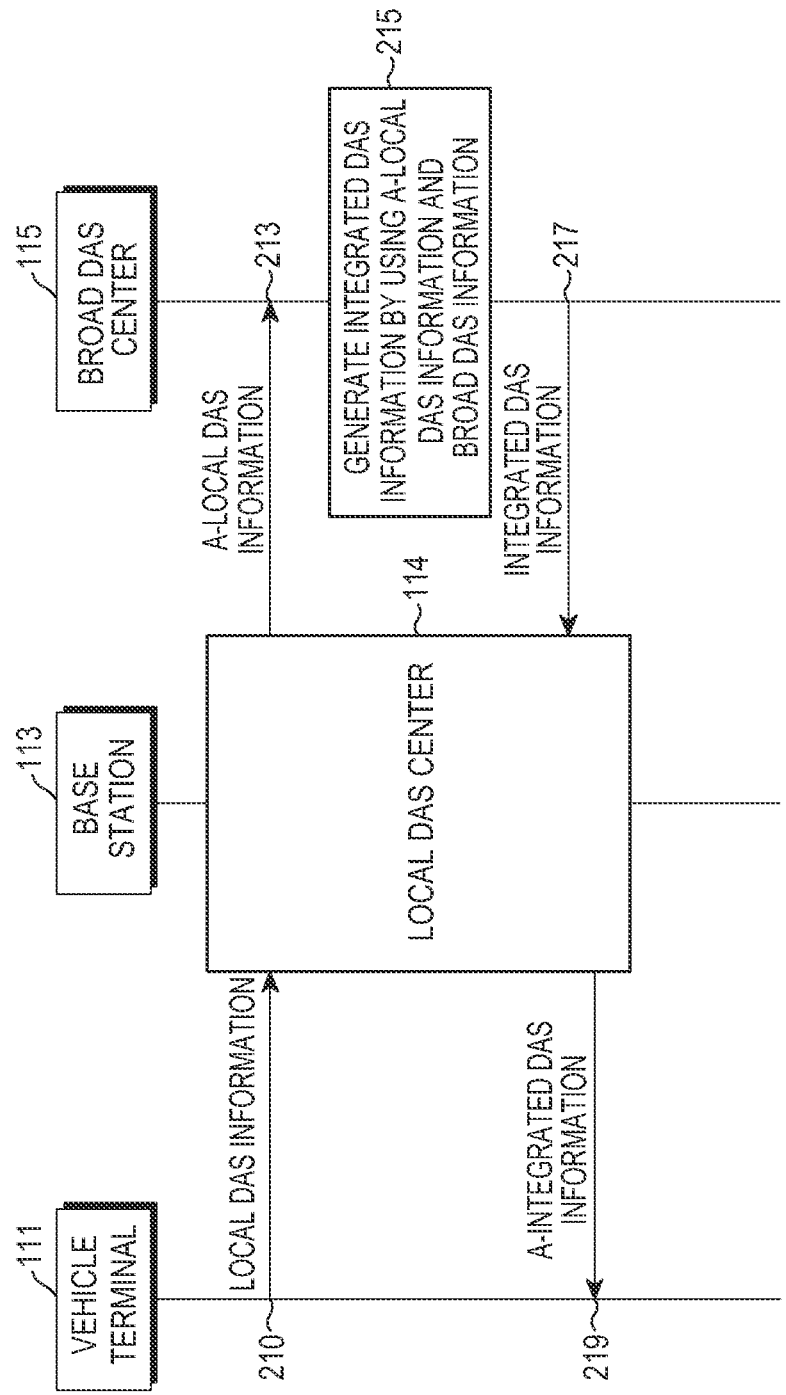
FIG. 2 illustrates a method of providing a general service in a Driving Assistance Service (DAS) system according to an embodiment of the present disclosure.

FIG. 2 illustrates a method of providing a general service in a DAS system according to an embodiment of the present disclosure.

Referring to FIG. 2, in operation 210, the vehicle terminal 111 gathers local DAS information, and transmits the local DAS information to the local DAS center 114 within the base station 113. In operation 213, the local DAS center 114 generates A-local DAS information by analyzing the local DAS information, and transmits the generated A-local DAS information to the broad DAS center 115. In operation 215, the broad DAS center 115 generates broad DAS information by gathering A-local DAS information from terminals, road information of surroundings, and the like, and generates integrated DAS information by using the broad DAS information and the A-local DAS information for a specific terminal. In operation 217, the broad DAS center 115 transmits the generated integrated DAS information to the local DAS center 114 again. In operation 219, the local DAS center 114 generates A-integrated DAS information for each of the terminals by analyzing the integrated DAS information. When the local DAS center 114 transmits the generated A-integrated DAS information to the corresponding vehicle terminal 111, the vehicle terminal 111 controls driving according to the A-integrated DAS information for vehicle terminal 111's own vehicle. When an instruction and/or command for controlling a vehicle is included in the A-integrated DAS information, the vehicle may be directly controlled according to the instruction and/or command. The DAS system may not pass through the broad DAS center 115 according to types of the local DAS information. That is, when a DAS service for a specific vehicle may be provided only by information gathered by the local DAS center 114, the local DAS center may generate the A-local DAS information and/or control information to be provided to the corresponding vehicle without passing through the broad DAS center 115, and may provide the generated information to the corresponding vehicle terminal.

Figure 3:
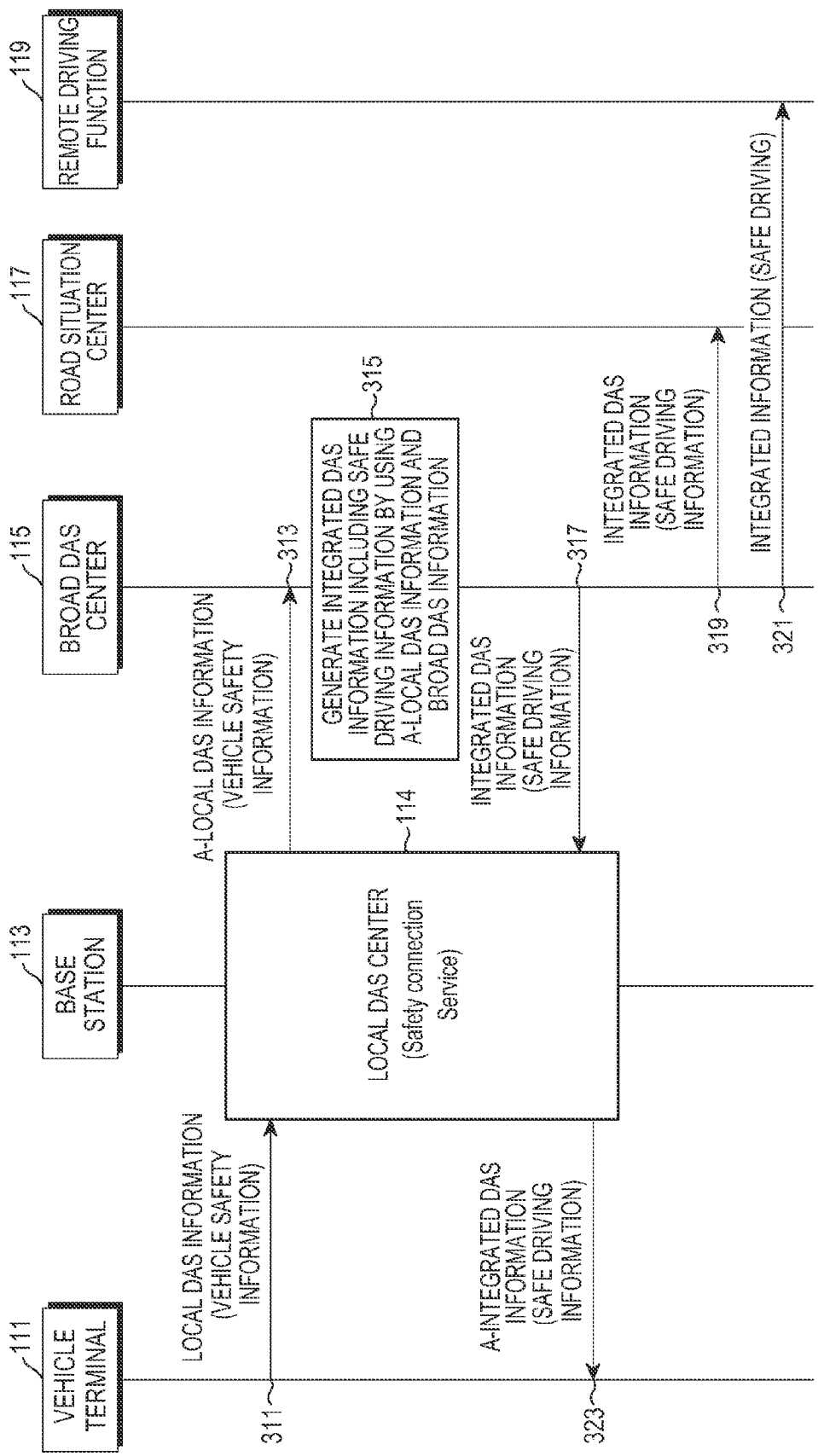
FIG. 3 illustrates a method of providing a safety connection service in a DAS system according to an embodiment of the present disclosure.

FIG. 3 illustrates a method of providing a safety connection service in a DAS system according to an embodiment of the present disclosure.

Referring to FIG. 3, in operation 311, the vehicle terminal 111 gathers local DAS information including vehicle safety information, and transmits the local DAS information to the local DAS center 114 of the base station 113. The vehicle safety information includes at least one of driving information, emergency information, surrounding information or driver biological information. The driving information indicates information on an event generated in a vehicle being currently driven, such as driving information about a vehicle, a location of a vehicle, Revolution Per Minute (RPM) information, whether a direction instruction light is used or not, whether video such as TeleVision (TV) or sound such as radio is played inside the corresponding vehicle, and the like. The emergency information indicates information corresponding to an emergency situation within a vehicle, such as whether a sudden stop is generated, whether an accident (collision, airbag deployment, and the like) is generated, whether lane departure (danger) is generated, exceeding the speed limit, signal violation, and the like. The surrounding information indicates information on a surrounding area of a vehicle, such as a location and a distance of an obstacle when there is the obstacle at the surrounding area of the vehicle during driving, a distance from a front vehicle or a rear vehicle, a change in the distance from the front vehicle or the rear vehicle, and the like. The driver biological information indicates a biological state of a driver, such as a drunk driving state of the driver, a sleepiness state of the driver, and the like.

In operation 313, the local DAS center 114 generates A-local DAS information by analyzing the local DAS center 114 including the vehicle safety information, and transmits the generated A-local DAS information to the broad DAS center 115. In operation 315, the broad DAS center 115 analyzes a driving pattern of the corresponding vehicle and generates integrated DAS information needed for safety of the vehicle, by using the vehicle safety information and the broad DAS information. The broad DAS information corresponds to information including the vehicle safety information and road situation information which are received from vehicles within a coverage area of the broad DAS center 115. The road situation information is received from the road situation center 117 and/or is gathered by the road situation center 117. In this way, the broad DAS center 115 generates the integrated DAS information by using the vehicle safety information of the corresponding vehicle and the information on a surrounding situation included in the broad DAS information, and the integrated DAS information includes safe driving information needed for safety of the corresponding vehicle.

A scheme of generating the safe driving information will be described below.

As an example, a state of an obstacle (obstacle in a stopped state or in a moving state) interferes with driving and/or local obstacle information such as a road pothole may be generated by analyzing information on a location and a distance of an obstacle included in the vehicle safety information received from each of the vehicles, and/or an obstacle and/or an obstacle region may be determined and information of the corresponding region may be generated by analyzing deceleration information of vehicles at a specific region, a distance from a front vehicle or a rear vehicle and a change in the distance, of vehicles in danger of lane departure, a lane change pattern of vehicles, and the like. Further, information may be generated by detecting a vehicle performing dangerous driving, such as drunk driving, drowsy driving, and/or careless driving by using information on lane departure and/or approach degrees of vehicles, whether a direction indication light is used, left-right shaking of the vehicle, biological information of drivers, and the like.

As another example, when a vehicle approaches a driving lane within a predetermined distance, lane departure danger information on a danger of lane departure of the corresponding vehicle and/or a surrounding vehicle may be generated. The predetermined distance may be set by a driving of the corresponding vehicle, set as a default value according to a size of the vehicle, and/or previously and entirely set for the DAS system. As yet another example, information on whether a lane is changed, determines that the lane is changed, based on whether the corresponding vehicle uses the turn signal and/or when an angle between the vehicle and the lane is within a predetermined range. Further, when a distance between the corresponding vehicle and a front vehicle and/or a rear vehicle is within a predetermined safe distance and/or when a distance between the vehicle and the obstacle/the obstacle region is within a predetermined range in comparison with a speed of the vehicle, it may be determined that the vehicle is in a dangerous situation. Further, when a speed of the corresponding vehicle or the surrounding vehicle exceeds a safe speed, it may be determined that the vehicle is in a dangerous situation. As yet another example, when the corresponding vehicle or the surrounding vehicle enters a stop line with a speed higher than a predetermined speed, it may be determined that the vehicle is in a dangerous situation. The determination criteria of the dangerous situation in the aforementioned examples may be set by a driver according to characteristics of the corresponding information, may be previously set by the DAS system, and may be set to be a default value of the vehicle according to a size, a type and other characteristics of the vehicle.

As described above, the integrated DAS information generated by the broad DAS center 115 is transmitted to the local DAS center 114, in operation 317. The local DAS center 114, may forward the A-integrated DAS information to the vehicle terminal 111 in operation 323. Further, if necessary, the broad DAS center 115 may transmit the integrated DAS information including the safe driving information to the road situation center 117 and/or the remote driving function 119, in operation 319 and/or in operation 321. Further, an instruction/request corresponding to the safe driving information is included in the integrated DAS information.

The road situation center 117 and/or the remote driving function 119 may take a necessary action according to the safe driving information and/or the instruction and/or request included in the integrated DAS information. For example, when the safe driving information includes information on the obstacle/the obstacle region, the road situation center 117 and/or the remote driving function 119 may take an action for disposing of the obstacle of the corresponding region. As another example, when the safe driving information includes dangerous driving information such as safe speed violation or unsafe driving such as drowsy driving, drunk driving, and the like, the road situation center 117 may notify the police of the dangerous driving information and/or the remote driving function 119 may perform remote driving for the corresponding vehicle. However, in order to perform the remote driving, the corresponding vehicle should be a vehicle which may perform a remote driving control. For reference, a reference value for taking the corresponding actions may be changed according to various setting schemes. For example, when cases where the distance between the obstacle and/or the obstacle region and the vehicle is within a safe distance are generated more than a predetermined reference value at the same region, the action for disposing of the obstacle and/or the obstacle region may be taken, or when it is determined that the vehicle is driven in an abnormal driving pattern, for example, when the corresponding vehicle continues the speed violation, remote driving may be performed. The remote driving control will be described below in FIG. 6.

Meanwhile, the local DAS center 114 generates A-integrated DAS information including the safe driving information for the corresponding terminal by analyzing the integrated DAS information including the safe driving information received from the broad DAS center 115, and transmits the A-integrated DAS information to the vehicle terminal. The vehicle terminal may provide the safe driving information to a driver to enable the driver to drive the vehicle by using the safe driving information, or may provide the safe driving information to a control apparatus of the vehicle to automatically perform a vehicle control corresponding to the safe driving information. Meanwhile, various means may be used as the scheme in which the vehicle terminal provides the safe driving information. For example, although there is voice guidance, video guidance, and the like, as the means, it is preferred that the information is provided through a heads-up display for the safe driving of the driver.

The safety connection service provided by the DAS system of an embodiment of the present disclosure previously provides, to the driver, a warning of the unsafety of the corresponding vehicle or the surrounding vehicles, the driving pattern of the dangerous driving, and the collision danger, so as to provide driving safety.

Figure 4:
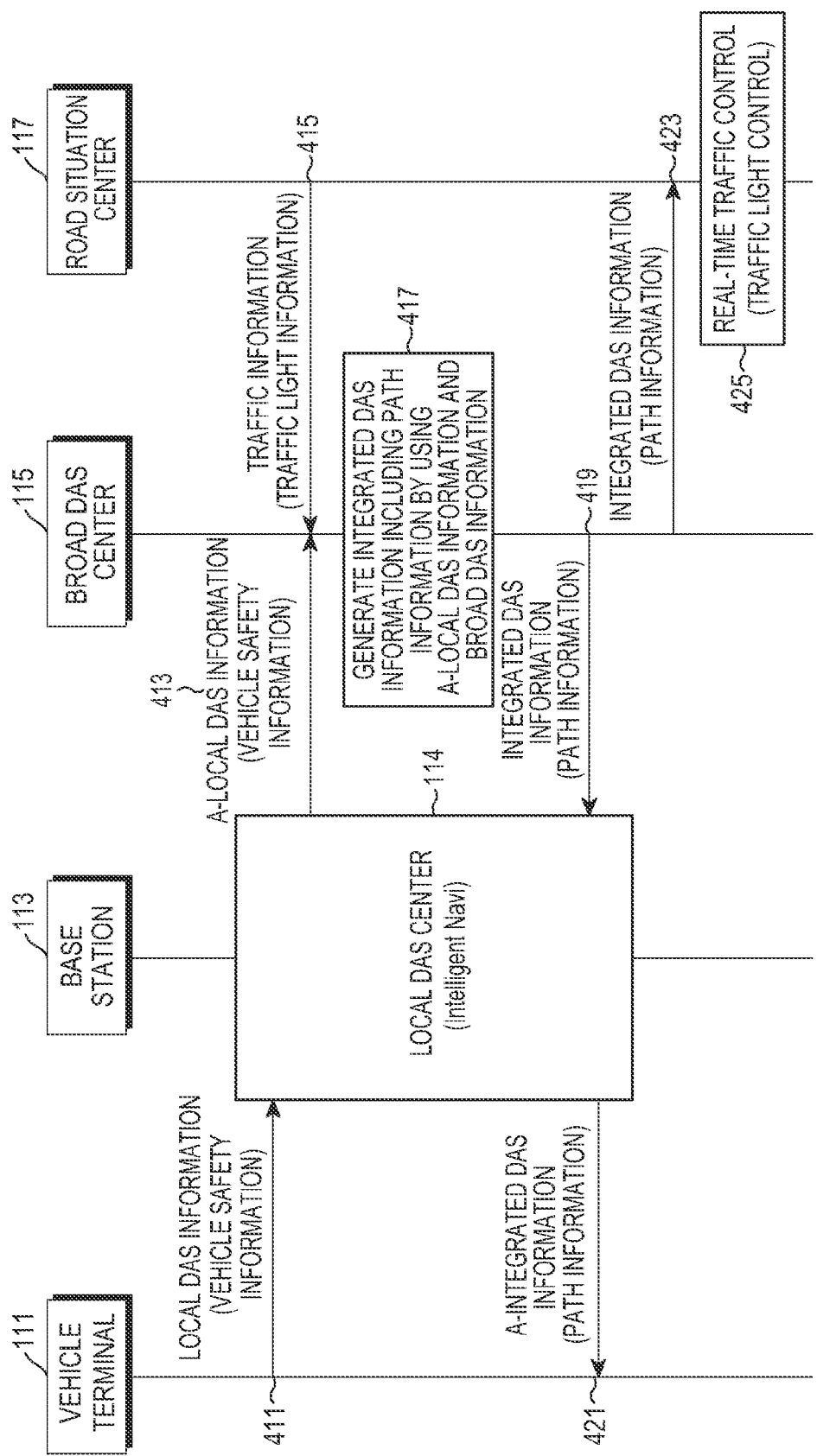
FIG. 4 illustrates a method of providing a network navigation service in a DAS system according to an embodiment of the present disclosure.

FIG. 4 illustrates a method of providing a network navigation service in a DAS system according to an embodiment of the present disclosure.

Referring to FIG. 4, in operation 411, the vehicle terminal 111 gathers local DAS information including vehicle driving information, and transmits the local DAS information to the local DAS center 114 of the base station 113. The vehicle driving information corresponds to information needed for acquiring an optimal path through a navigation service, and indicates departure point information, transit point information, destination point information, and the like. In operation 413, the local DAS center 114 generates A-local DAS information from the local DAS information including the vehicle driving information, and transmits the generated A-local DAS information to the broad DAS center 115. In operation 415, the broad DAS center 115 receives traffic information including traffic light information, from the road situation center 117. The broad DAS center 115 may gather the traffic information by operation of the broad DAS center 115. In addition, the traffic information may include at least one of real-time road vehicle increase and/or decrease statistics information, designated road speed limit information, a speed change rate of vehicles, and the like. In operation 417, the broad DAS center 115 generates integrated DAS information including path information by using the vehicle driving information and the traffic information. The path information indicates information on a path between the departure point and the destination point provided by a general navigation service. In operation 419, the integrated DAS information including the path information is transmitted to the local DAS center 114, and in operation 421, the local DAS center 114 generates A-integrated DAS information by using the integrated DAS information, and transmits the generated A-integrated DAS information to the vehicle terminal, so that the navigation service may be provided to a user. If necessary, in operation 423, the broad DAS center 115 transmits the integrated DAS information to the road situation center 117. In operation 425, the road situation center 117 performs a real-time traffic control such as controlling of flickering of a traffic light to make a traffic flow be smoother by using the path information and pedestrian information. The pedestrian information corresponds to information acquired by the road situation center 117 or from the outside. Such a network-based intelligent navigation service considers real-time traffic light information, statistics information, real-time road vehicle increase and/or decrease statistics information, a road speed limit, and a speed change rate of other vehicles, to disperse vehicles before generating traffic congestion, so as to make an overall traffic system be efficient.

Figure 5:
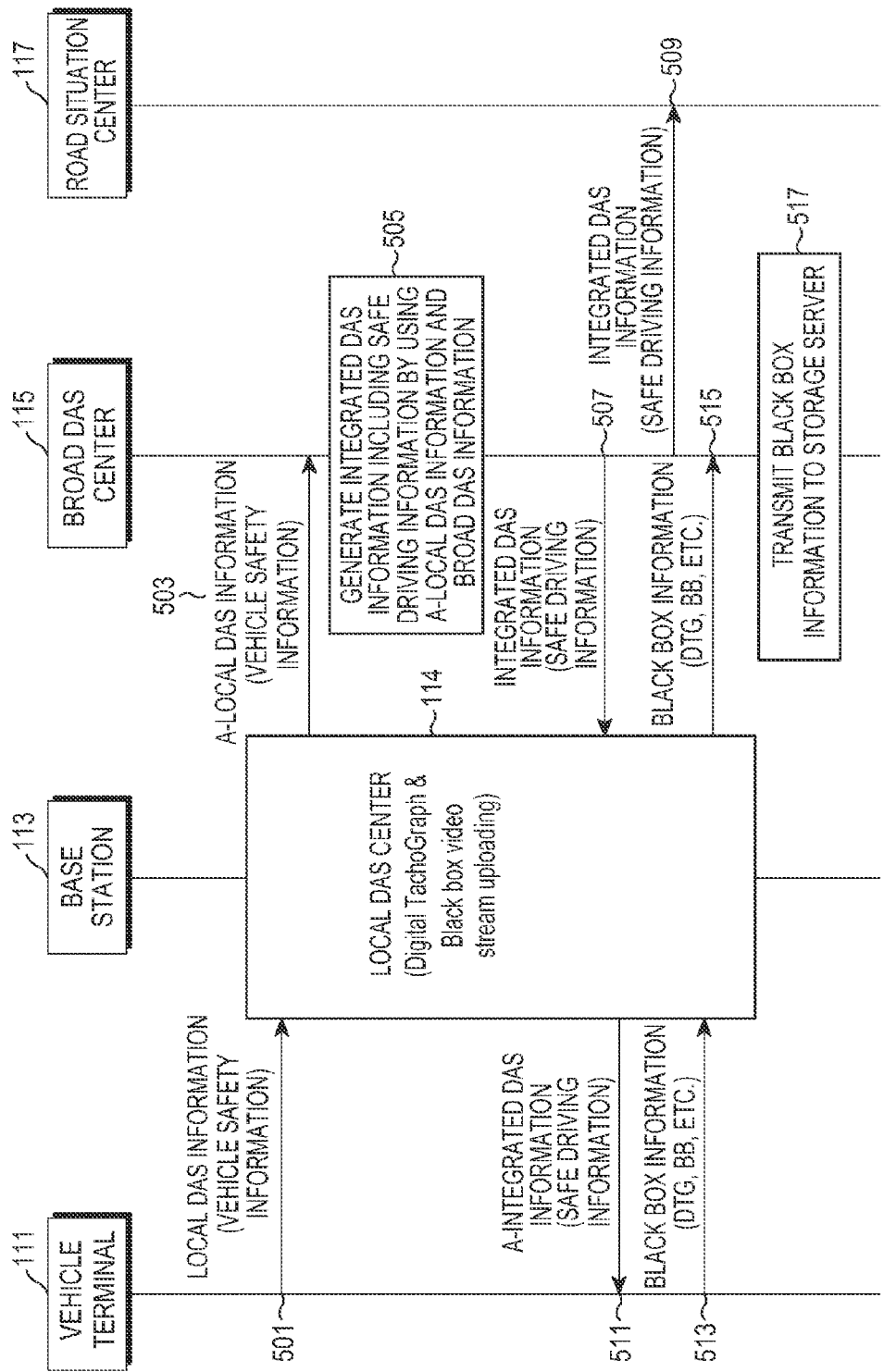
FIG. 5 illustrates a method of providing a network black box service in a DAS system according to an embodiment of the present disclosure.

FIG. 5 illustrates a method of providing a network black box service in a DAS system according to an embodiment of the present disclosure.

Referring to FIG. 5, in operation 501, the vehicle terminal 111 gathers local DAS information including vehicle safety information, and transmits the local DAS information to the local DAS center 114 of the base station 113. The vehicle safety information is equal to that of FIG. 2. In operation 503, the local DAS center 114 generates A-local DAS information by using the local DAS information including the vehicle safety information, and transmits the generated A-local DAS information to the wide DAS center 115. In operation 505, the broad DAS center 115 generates integrated DAS information including safe driving information by using the local DAS information including the vehicle safety information and broad DAS information. The safe driving information is equal to the safe driving information described in FIG. 3. In operation 507 and operation 509, the broad DAS center 115 transmits the integrated DAS information including the safe driving information, to the local DAS center 114 and the road situation center 117, respectively. If necessary, the road situation center 117 performs the same operation as that of FIG. 3.

In operation 511, the local DAS center 114 generates A-integrated DAS information for the corresponding vehicle by using the integrated DAS information including the safe driving information, and transmits the generated A-integrated DAS information to the vehicle terminal 111. In operation 513, when the received safe driving information corresponds to information on a situation in which a possibility of a traffic accident is high, the vehicle terminal 111 starts to transmit the black box information to the local DAS center 114 in a form of streaming or a file. The information on the situation in which the possibility of the traffic accident is high may be set by a driver and/or a system. For example, the information on the situation in which the possibility of the traffic accident is high may correspond to a case where the driver's vehicle or the surrounding vehicles exceed a speed limit, a case where an unsafe driving pattern is generated, a case where the driver's vehicle approaches the obstacle within a predetermined distance, a case where the surrounding vehicles approach the driver's vehicle within a safe distance, and the like. In operation 515, the local DAS center 114 stores the black box information, and when the black box information corresponds to information in which an accident is recorded, transmits the black box information to the broad DAS center 115. In operation 517, the broad DAS center 115 transmits the black box information including the accident record according to predetermined schemes such as transmitting of the black box information to a storage server (not illustrated) such as a cloud or an e-mail of the corresponding vehicle's driver.

In the case of the aforementioned network-based intelligent black box service, the local DAS center 114 stores the black box information received from the vehicle terminal in a situation in which the accident danger is high, and transmits the block box information including the accident record to the broad DAS center 115, so as to safely store the black box information without record failure which may be generated when the black box information is stored by itself at a time of an accident or loss of the black box information which may be generated due to the black box malfunction.

Figure 6:
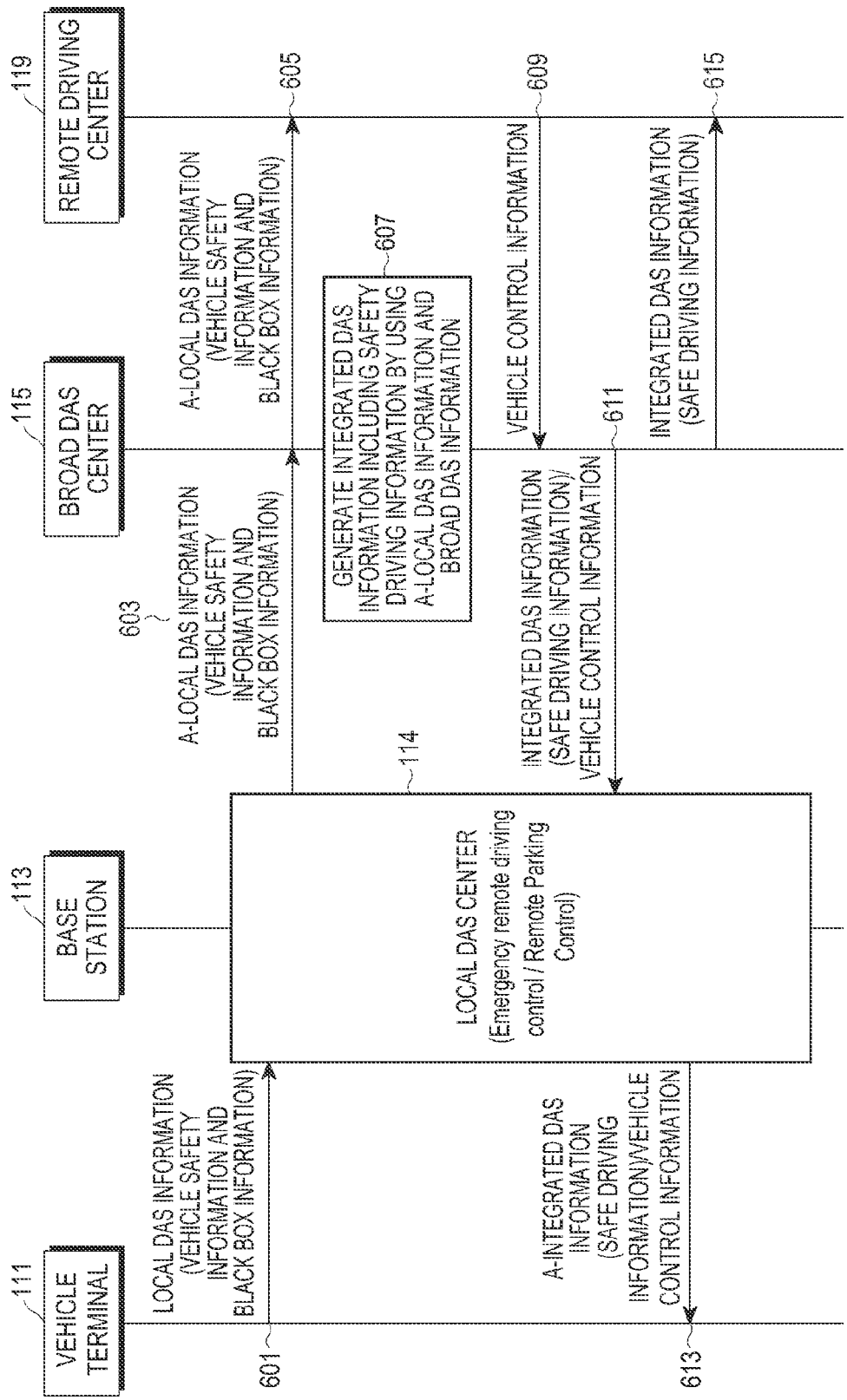
FIG. 6 illustrates a method of providing an emergency remote driving service in a DAS system according to an embodiment of the present disclosure.

FIG. 6 illustrates a method of providing an emergency remote driving service in a DAS system according to an embodiment of the present disclosure.

The emergency remote driving service proposed in an embodiment of the present disclosure corresponds to a service for notifying a driver of an abnormal state of vehicle driving, and when the abnormal state of the vehicle is not resolved for a predetermined time period, leading the vehicle to a safe place through remote control, so as to prevent an accident from being generated.

Referring to FIG. 6, in operation 601, the vehicle terminal 111 gathers local DAS information including vehicle safety information and/or black box information, and transmits the local DAS information to the local DAS center 114 of the base station 113. The vehicle safety information and the black box information are the same as those of FIG. 5. In operation 603, the local DAS center 114 generates A-local DAS information by using the local DAS information, and transmits the generated A-local DAS information to the broad DAS center 115. Further, in operation 605, the broad DAS center 115 transmits the A-local DAS information to the remote driving function 119. The remote driving function 119 may be implemented by a function block within the broad DAS center 115, or may be configured by a separate center separated from the broad DAS center 115.

In operation 607, the broad DAS center 115 generates integrated DAS information including safe driving information by using the local DAS information including the vehicle safety information and/or the black box information, and the broad DAS information. Further, in operation 615, the broad DAS center 115 transmits the generated integrated DAS information to the remote driving function 119. The remote driving function 119 determines a vehicle which needs remote driving, by using the integrated DAS information, and performs the remote driving according to the determination.

The remote driving function 119 may rapidly determine whether the corresponding vehicle is in an emergency situation or not, by using the vehicle safety information and/or the black box information included in the A-local DAS information received in operation 605. When the vehicle corresponds to the emergency situation so that the remote driving is required, in operation 609, the remote driving function 119 generates vehicle control information for performing remote control for the corresponding vehicle, and transmits the vehicle control information to the broad DAS center 115. Although operation 609 is illustrated at a time point after operation 607, it is illustrated merely for convenience. The faster the time point of operation 609, the better. The reason is that the corresponding vehicle is currently in the emergency situation so that the control information for the remote driving should be quickly transmitted to the corresponding vehicle. Thus, operation 609 may be performed before operation 607.

In operation 611, the broad DAS center 115 transmits, to the local DAS center 114, at least one of the integrated DAS information generated in operation 607, and the vehicle control information received from the remote driving function 119. As an example, when the vehicle is in the emergency situation, only the vehicle control information may be transmitted to the local DAS center 114 before generation of the A-integrated DAS information. As another example, when the vehicle control information is received from the remote driving function 119 after generation of the A-integrated DAS information, the vehicle control information and the integrated DAS information may be transmitted to the local DAS center 114 together.

In operation 613, the local DAS center 114 generates A-integrated DAS information by using the integrated DAS information, and transmits, to the vehicle terminal 111, the A-integrated DAS information and/or the vehicle control information. In this way, the safety is provided to the vehicle driver by moving the corresponding vehicle to a safe place through the remote driving when the corresponding vehicle is in the emergency situation. When a channel situation between the vehicle terminal 111 for the remote driving and the remote driving function 119 is not good, only the vehicle control information may be transmitted to the local DAS center 114. Further, even after a channel for the remote driving is set, if necessary, an uplink transmission speed of driving video information of the corresponding vehicle may be adjusted in accordance with the channel state.

Figure 7:
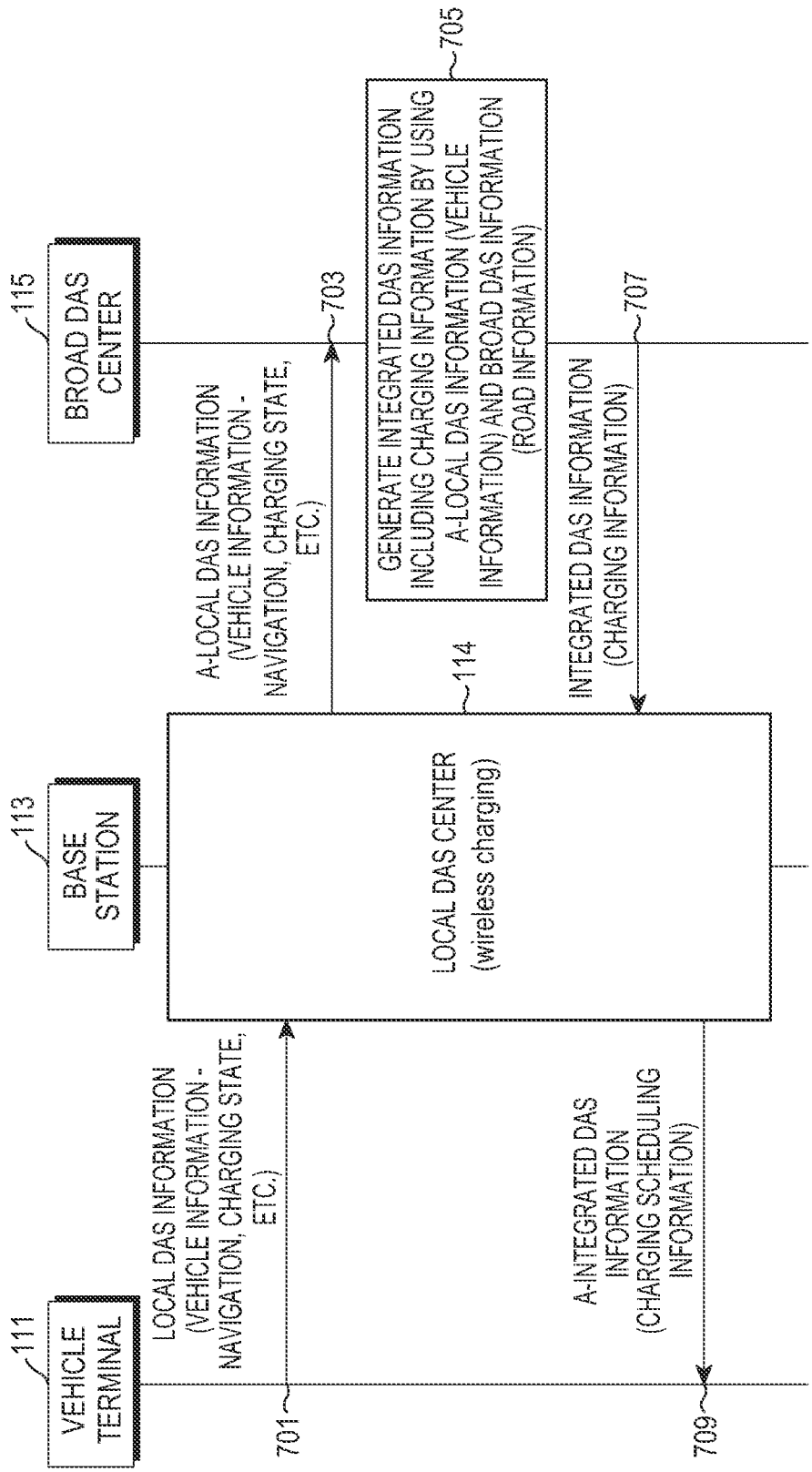
FIG. 7 illustrates a method of providing a wireless charging service in a DAS system according to an embodiment of the present disclosure.

FIG. 7 illustrates a method of providing a wireless charging service in a DAS system according to an embodiment of the present disclosure.

A wireless charging service according to an embodiment of the present disclosure may provide a wireless charging service with respect to electric vehicles, for example, by making the base stations 113 and 131 of FIG. 1 to directly activate a wireless charging function block which may be included in the base stations, at the coverage area of each of the corresponding base stations. As another example, the wireless charging service may be provided through RF blocks 125 and 127 connected with the base station 113. The RF blocks 125 and 127 are installed in the vicinity of the road such as a street light or a roadside tree, so as to provide a more efficient charging service even while the electric vehicle is moving. Further, even when urgent electric power charging of a general vehicle in addition to the electric vehicles is required, the charging service may be provided.

Referring to FIG. 7, in operation 701, the vehicle terminal 111 gathers local DAS information including at least one of a navigation state, an electric power state of a vehicle, a charging state of the vehicle, and/or a charging request of the corresponding vehicle, and transmits the local DAS information to the local DAS center 114 of the base station 113. In operation 703, the local DAS center 114 generates A-local DAS information by using the local DAS information including the vehicle information on the charging state, and the like, and transmits the generated A-local DAS information to the wide DAS center 115.

In operation 705, the broad DAS center 115 generates integrated DAS information including charging information by using the local DAS information including the vehicle information and broad DAS information including road information. Further, in operation 707, the broad DAS center 115 transmits the generated integrated DAS information to the local DAS center 114. The charging information may include information of the local DAS centers 114 with respect to vehicles which need or request the charging, which may manage the charging during driving of the vehicles by considering a battery state, a vehicle driving section, and the like, of each of the vehicles.

In operation 709, the local DAS center 114 generates A-integrated DAS information including A-charging scheduling information by using the integrated DAS information including the charging information, and transmits the generated integrated DAS information to the vehicle terminal 111. Further, the A-integrated DAS information includes charging information for charging the corresponding vehicle, in detail, the charging scheduling information. The scheduling information may include information of vehicles which need charging, and information of a charging section of the base stations according to moving of the corresponding vehicles, a charging sequence and a charging time of the corresponding vehicles by the base stations, and the like. After operation 709, the scheduling is performed according to the charging scheduling information. For example, when the base station 113 includes a separate charging function block for wireless charging and in the scheduling information, the base station 113 is scheduled to charge the vehicle terminal 111 at a specific time and a specific road section, the base station 113 may transmit charging energy to the vehicle terminal 111 by activating the charging function block at the corresponding time and the corresponding section.

The charging service using the aforementioned DAS system may perform the charging scheduling by using the DAS information, and may perform the charging even when the vehicles are moving since the charging is performed by using the base station.

Figure 8:
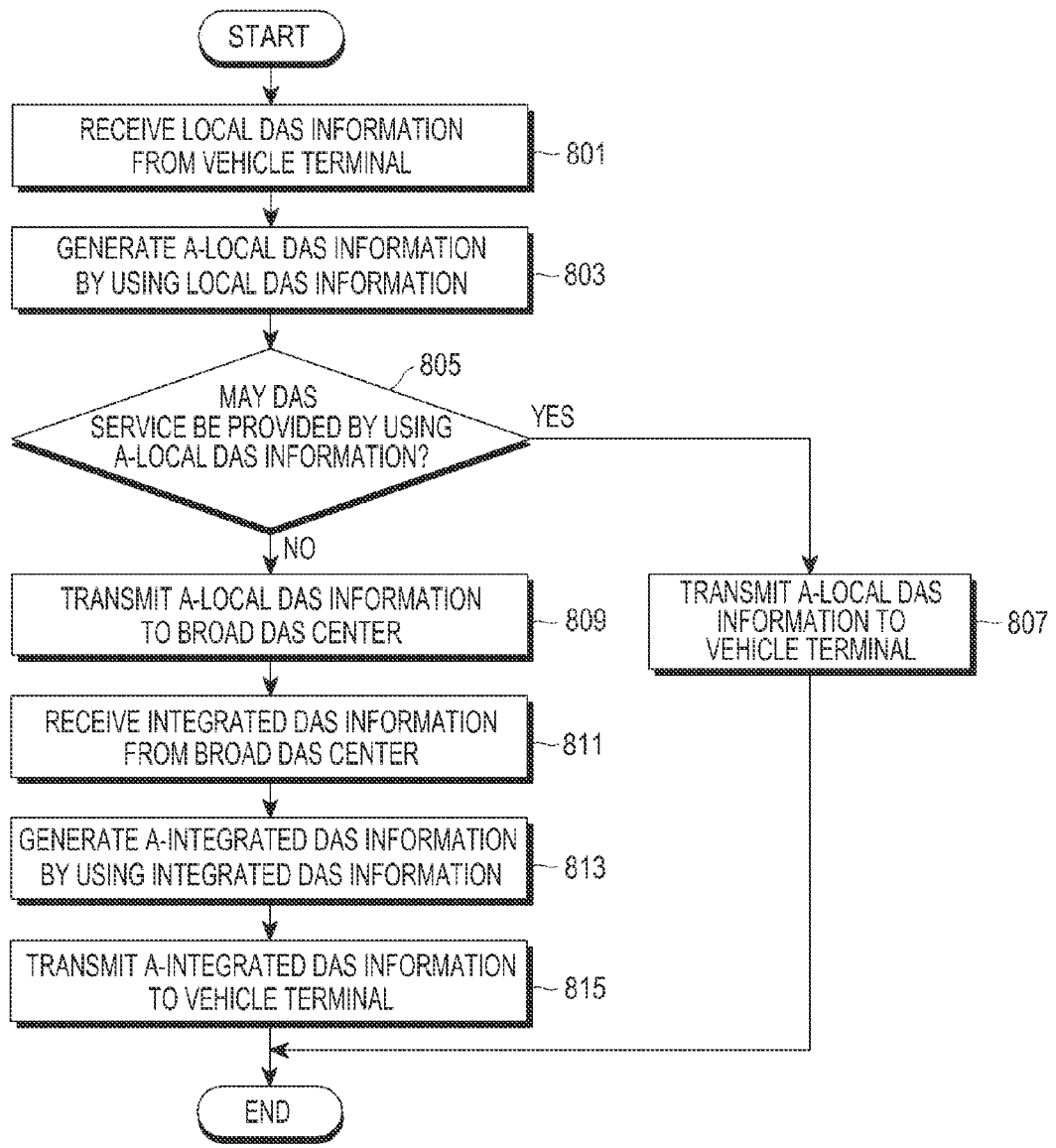
FIG. 8 is a flowchart illustrating an operation of a local DAS center according to an embodiment of the present disclosure.

FIG. 8 is a flowchart illustrating an operation of a local DAS center according to an embodiment of the present disclosure.

Referring to FIG. 8, in operation 801, the local DAS center 114 receives local DAS information from the vehicle terminal 111. In operation 803, the local DAS center 114 generates A-local DAS information by analyzing the local DAS information.

In operation 805, the local DAS center 114 determines whether the DAS may be provided to the vehicle terminal 111, by using the A-local DAS information. When it is determined that the DAS may be provided to the vehicle terminal 111, the operation proceeds to operation 807, and the local DAS center 114 transmits the A-local DAS information to the vehicle terminal 111. When it is determined that the DAS may not be provided to the vehicle terminal 111, the operation proceeds to operation 809, and the local DAS center 114 transmits the A-local DAS information to the broad DAS center 115. In operation 811, the local DAS center 114 receives integrated DAS information from the broad DAS center 115. The integrated DAS information is generated by using the A-local DAS information and the broad DAS center 115.

In operation 813, the local DAS center 114 generates A-integrated DAS information for the vehicle terminal 111, by analyzing the integrated DAS information. In operation 815, the local DAS center 114 transmits the A-integrated DAS information to the vehicle terminal 111.

Figure 9:
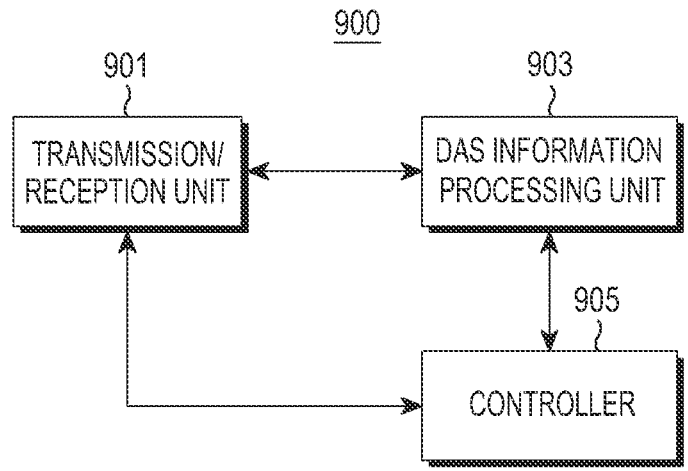
FIG. 9 illustrates a configuration of a local DAS device according to an embodiment of the present disclosure.

FIG. 9 illustrates a configuration of a local DAS device according to an embodiment of the present disclosure.

Referring to FIG. 9, a local DAS center device 900 includes a transmission/reception unit 901, a DAS information processing unit 903, and a controller 905, and performs an operation according to the aforementioned embodiments.

In detail, the transmission/reception unit 901 receives local DAS information from the vehicle terminal.

The local DAS center 114 receives the local DAS information.

The DAS information processing unit 903 generates A-local DAS information by analyzing the received local DAS information.

The controller 905 determines whether the DAS may be provided to the vehicle terminal by using the A-local DAS information. When it is determined that the DAS may be provided to the vehicle terminal, the controller 905 transmits the A-local DAS information to the vehicle terminal. When it is determined that the DAS may not be provided to the vehicle terminal, the controller 905 transmits the A-local DAS information to the broad DAS center.

The transmission/reception unit 901 receives integrated DAS information from the broad DAS center. For reference, the integrated DAS information is generated by using the A-local DAS information and the broad DAS center.

The DAS information processing unit 903 generates A-integrated DAS information for the vehicle terminal, by analyzing the integrated DAS information, and transmits the A-integrated DAS information to the vehicle terminal through the transmission/reception unit 901.

Figure 10:
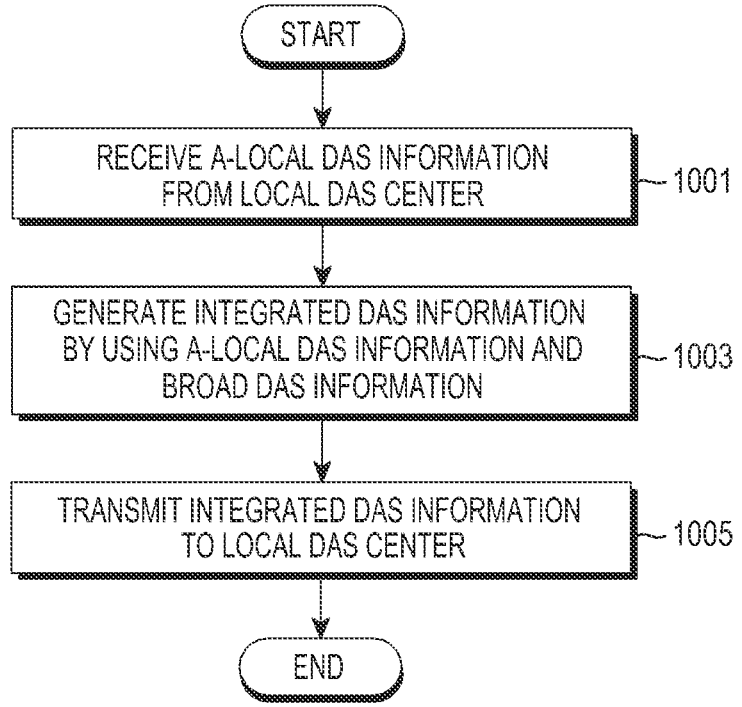
FIG. 10 is a flowchart illustrating an operation of a broad DAS center according to an embodiment of the present disclosure.

FIG. 10 is a flowchart illustrating an operation of a broad DAS center according to an embodiment of the present disclosure.

Referring to FIG. 10, in operation 1001, the broad DAS center receives A-local DAS information from the local DAS center. In operation 1003, the broad DAS center generates integrated DAS information by using the received A-local DAS information and broad DAS information. Herein, the broad DAS information is generated by using A-local DAS information received from other DAS centers rather than the local DAS center and road information within a coverage of the broad DAS center. Further, the broad DAS information is stored in a storage unit in the broad DAS center or is generated by the broad DAS center before the integrated DAS information is generated.

In operation 1005, the broad DAS center transmits the integrated DAS information generated in operation 1003, to the local DAS center.

Figure 11:
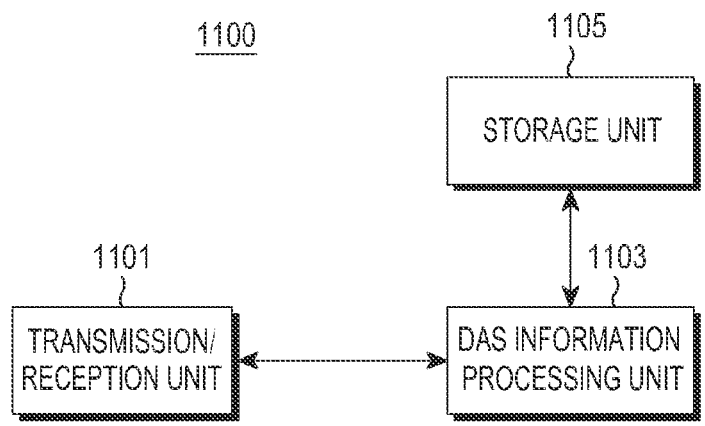
FIG. 11 illustrates an operation of a broad DAS center device according to an embodiment of the present disclosure.

FIG. 11 illustrates an operation of a broad DAS center device according to an embodiment of the present disclosure.

Referring to FIG. 11, the broad DAS center device 1100 includes a transmission/reception unit 1101, a DAS information processing unit 1103, and a storage unit 1105, and performs an operation of the broad DAS center according to the aforementioned embodiments.

In detail, the transmission/reception unit 1101 receives A-local DAS information from the local DAS center.

The DAS information processing unit 1103 generates integrated DAS information by using the received A-local DAS information and broad DAS information. Herein, the broad DAS information is generated by using A-local DAS information received from other local DAS centers rather than the local DAS center and road information within a coverage of the broad DAS center. Further, the broad DAS information is previously stored in the storage unit 1105 or is generated by the DAS information processing unit 1103 before the integrated DAS information is generated. Furthermore, the DAS information processing unit 1103 transmits the generated integrated DAS information to the local DAS center through the transmission/reception unit 1101.

Figure 12:
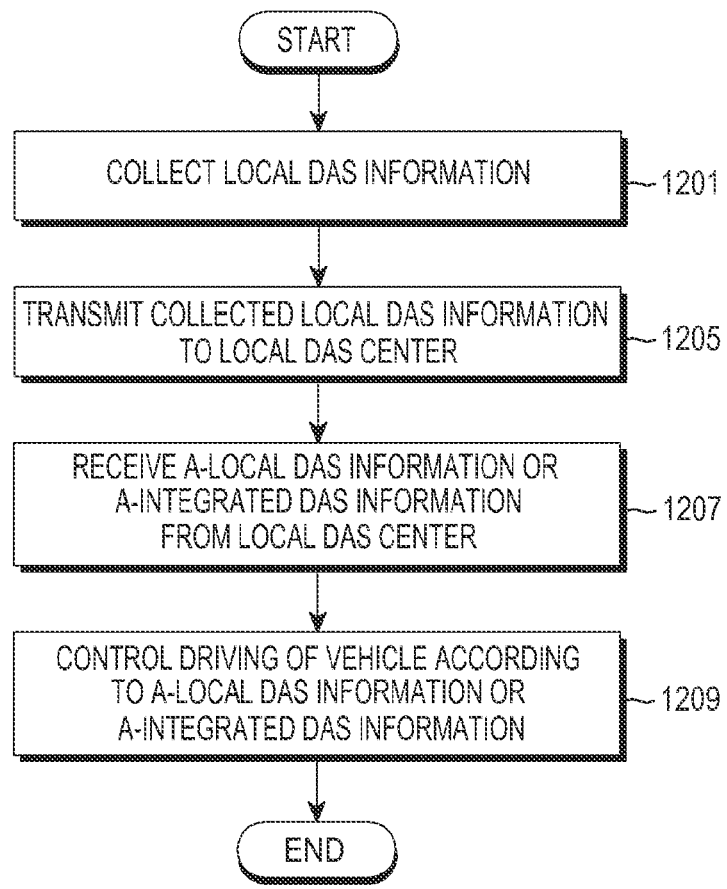
FIG. 12 illustrates a flowchart illustrating an operation of a vehicle terminal according to an embodiment of the present disclosure.

FIG. 12 illustrates a flowchart illustrating an operation of a vehicle terminal according to an embodiment of the present disclosure.

Referring to FIG. 11, in operation 1201, the vehicle terminal collects the local DAS information. In operation 1203, the vehicle terminal transmits the collected local DAS information to the local DAS center.

In operation 1205, the vehicle terminal receives the A-local DAS information or the A-integrated DAS information from the local DAS center. In operation 1207, the vehicle terminal controls driving of a vehicle according to the received A-local DAS information or the received A-integrated DAS information.

Figure 13:
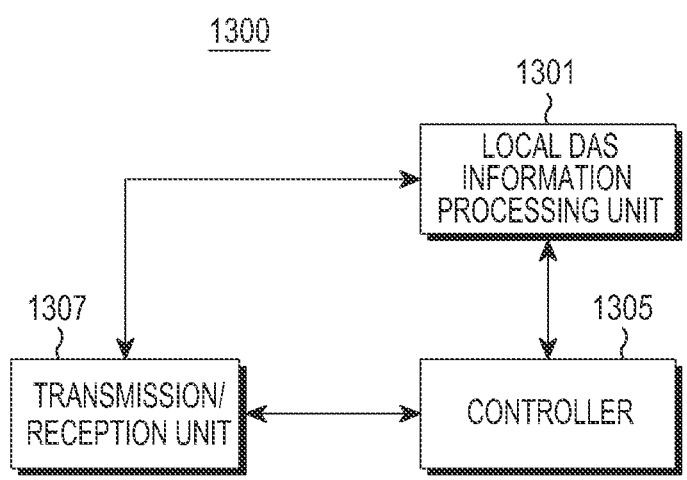
FIG. 13 illustrates an operation of a vehicle terminal according to an embodiment of the present disclosure.

FIG. 13 illustrates an operation of a vehicle terminal according to an embodiment of the present disclosure.

The vehicle terminal 1300 includes a local DAS information processing unit 1301, a control unit 1305 and a transmission/reception unit 1307 and performs an operation of the vehicle terminal according to the aforementioned embodiments.

The local DAS information processing unit collects the local DAS information and transmits the collected local DAS information to the local DAS center through the transmission/reception unit 1307.

The transmission/reception unit 1307 receives the A-local DAS information or the A-integrated DAS information from the local DAS center.

The control unit 1305 controls driving of a vehicle according to the received A-local DAS information or the received A-integrated DAS information.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a driving assistance service (DAS) by a local DAS server in a communication network, the method comprising:
   receiving, from a vehicle terminal, local DAS information including at least one of driving information of the vehicle and surrounding information of the vehicle;
   generating analyzed-local (A-local) DAS information based on the received local DAS information;
   transmitting the generated A-local DAS information to the vehicle terminal if the DAS based on the generated A-local DAS information is available,
   transmitting the generated A-local DAS information to a broad DAS server if the DAS based on the generated A-local DAS information is not available; and
   receiving, from the broad DAS server, integrated DAS information based on the A-local DAS information and broad DAS information within the broad DAS server,
   wherein the local DAS server is located out of the vehicle and receives the local DAS information from each of at least one vehicle terminal within a coverage of the local DAS server.

2. The method of claim 1, further comprising:
   generating analyzed-integrated (A-integrated) DAS information for assisting driving of the vehicle, based on the received integrated DAS information; and
   transmitting the generated A-integrated DAS information to the vehicle terminal.

3. The method of claim 1,
   wherein the DAS includes a safety connection service which provides information on safe driving of the vehicle, and
   wherein the local DAS information includes vehicle safety information relating to the safe driving of the vehicle.

4. The method of claim 1, wherein the DAS includes a navigation service using the communication network, and the local DAS information includes driving information of the vehicle.

5. The method of claim 1,
   wherein the DAS includes a black box service using the communication network, and
   wherein the local DAS information includes driving information of the vehicle.

6. The method of claim 1,
   wherein the DAS includes a remote driving service using the communication network, and
   wherein the local DAS information includes driving information of the vehicle.

7. The method of claim 1,
   wherein the DAS includes a charging service using the communication network, and
   wherein the local DAS information includes charging state information of the vehicle.

8. A method for providing a driving assistance service (DAS) by a broad DAS server in a communication network, the method comprising:
   receiving, from a local DAS server, analyzed-local (A-local) DAS information generated from local DAS information of a vehicle terminal;
   generating integrated DAS information based on the A-local DAS information and broad DAS information within the broad DAS server; and
   transmitting the generated integrated DAS information to the local DAS server,
   wherein the local DAS server is located out of a vehicle and receives the local DAS information from each of at least one vehicle terminal within a coverage of the local DAS server.

9. The method of claim 8, wherein the broad DAS information comprises at least one piece of the A-local DAS information received from at least one of other local DAS servers rather than the local DAS server, and road information within a coverage of the broad DAS server.

10. The method of claim 8,
    wherein the DAS includes a safety connection service which provides information on safe driving of the vehicle, and
    the local DAS information includes vehicle safety information relating to the safe driving of the vehicle.

11. The method of claim 8,
    wherein the DAS includes a navigation service using the communication network, and
    wherein the local DAS information includes driving information of the vehicle.

12. The method of claim 8,
wherein the DAS includes a black box service using the communication network, and
wherein the local DAS information includes driving information of the vehicle.

13. The method of claim 8,
wherein the DAS includes a remote driving service using the communication network, and
wherein the local DAS information includes driving information of the vehicle.

14. The method of claim 8,
wherein the DAS includes a charging service using the communication network, and
wherein the local DAS information includes charging state information of the vehicle.

15. A method for receiving driving assistance service (DAS) at a vehicle comprising a local DAS terminal in a communication network, the method comprising:
collecting local DAS information comprising at least one of driving information of the vehicle and surrounding information of the vehicle;
transmitting the collected local DAS information to a local DAS server;
receiving, from the local DAS server, control information generated based on the local DAS information; and
controlling driving of the vehicle according to the control information,
wherein the control information includes analyzed-local (A-local DAS) information generated by the local DAS server based on the local DAS information if the DAS based on the generated A-local DAS information is available,
wherein the control information corresponds to analyzed-integrated (A-integrated) DAS information if the DAS based on the generated A-local DAS information is not available,
wherein the A-integrated DAS information is generated by analyzing integrated DAS information generated in a broad DAS server based on analyzed-local (A-local) DAS information generated by analyzing the local DAS information and broad DAS information within the broad DAS server, and
wherein the local DAS server is located out of the vehicle and receives the local DAS information from each of at least one vehicle terminal within a coverage of the local DAS server.

16. The method of claim 15,
wherein the DAS includes a safety connection service which provides information on safe driving of the vehicle, and
wherein the local DAS information includes vehicle safety information relating to a safe driving of the vehicle.

17. The method of claim 15,
wherein the DAS includes a navigation service using the communication network, and
wherein the local DAS information includes driving information of the vehicle.

18. The method of claim 15,
wherein the DAS includes a black box service using the communication network, and
wherein the local DAS information includes driving information of the vehicle.

19. The method of claim 15,
wherein the DAS includes a remote driving service using the communication network, and
wherein the local DAS information includes driving information of the vehicle.

20. The method of claim 15,
wherein the DAS includes a charging service using the communication network, and
wherein the local DAS information includes charging state information of the vehicle.

21. A local driving assistance service (DAS) server for providing a DAS to a vehicle in a communication network, the local DAS server comprising:
a transmission/reception unit configured to receive, from a vehicle terminal, local DAS information comprising at least one of driving information of the vehicle and surrounding information of the vehicle;
a DAS information processing unit configured to generate Analyzed-local (A-local) DAS information based on the received local DAS information;
a controller configured to:
transmit, to the vehicle terminal, the generated A-local DAS information through the transmission/reception unit if the DAS based on the generated A-local DAS information is available, and
transmit the generated A-local DAS information to a broad DAS server if the DAS based on the generated A-local DAS information is not available,
wherein the transmission/reception unit receives, from the broad DAS server, integrated DAS information based on the A-local DAS information and broad DAS information in the broad DAS server, and
wherein the local DAS server is located out of the vehicle and receives the local DAS information from each of at least one vehicle terminal within a coverage of the local DAS server.

22. The local DAS server of claim 21, wherein
the DAS information processing unit generates Analyzed-integrated (A-integrated) DAS information for assisting driving of the vehicle based on the received integrated DAS information, and transmits the generated A-integrated DAS information to the vehicle terminal through the transmission/reception unit.

23. The local DAS server of claim 21,
wherein the DAS includes a safety connection service which provides information on safe driving of the vehicle, and
wherein the local DAS information includes vehicle safety information relating to a safe driving of the vehicle.

24. The local DAS server of claim 21,
wherein the DAS includes a navigation service using the communication network, and
wherein the local DAS information includes driving information of the vehicle.

25. The local DAS server of claim 21,
wherein the DAS includes a black box service using the communication network, and
wherein the local DAS information includes driving information of the vehicle.

26. The local DAS server of claim 21,
wherein the DAS includes a remote driving service using the communication network, and
wherein the local DAS information includes driving information of the vehicle.

27. The local DAS server of claim 21,
wherein the DAS includes a charging service using the communication network, and
wherein the local DAS information includes charging state information of the vehicle.

28. A broad driving assistance service (DAS) server for providing the DAS in a communication network, the broad DAS server comprising:

a transmission/reception unit configured to receive, from a local DAS server, analyzed-local (A-local) DAS information generated local based on DAS information of a vehicle terminal;

a DAS information processing unit configured to:
  generate integrated DAS information based on the A-local DAS information and broad DAS information within the broad DAS, and
  transmit the generated integrated DAS information to the local DAS server,
wherein the local DAS server is located out of a vehicle and receives the local DAS information from each of at least one vehicle terminal within a coverage of the local DAS server.

29. The broad DAS server of claim 28, wherein the broad DAS information comprises at least one piece of A-local DAS information received from at least one of other local DAS servers rather than the local DAS server and road information within a coverage of the broad DAS server.

30. The broad DAS server of claim 28,
wherein the DAS includes a safety connection service which provides information on safe driving of the vehicle, and
wherein the local DAS information includes vehicle safety information relating to the safe driving of the vehicle.

31. The broad DAS server of claim 28,
wherein the DAS includes a navigation service using the communication network, and
wherein the local DAS information includes driving information of the vehicle.

32. The broad DAS server of claim 28,
wherein the DAS includes a black box service using the communication network, and
wherein the local DAS information includes driving information of the vehicle.

33. The broad DAS server of claim 28,
wherein the DAS includes a remote driving service using the communication network, and
wherein the local DAS information includes driving information of the vehicle.

34. The broad DAS server of claim 28,
wherein the DAS includes a charging service using the communication network, and
wherein the local DAS information includes charging state information of the vehicle.

35. A local driving assistance service (DAS) terminal within a vehicle to receive the DAS in a communication network, the local DAS terminal comprising:
  a local DAS information collection unit configured to collect local DAS information comprising at least one of driving information of the vehicle and surrounding information of the vehicle;
  a transmission/reception unit configured to:
    transmit the collected local DAS information to a local DAS server, and
    receive, from the local DAS server, control information generated based on the local DAS information; and
  a controller configured to control driving of the vehicle based on the control information,
wherein the control information includes analyzed-local (A-local DAS) information generated by the local DAS server based on the local DAS information if the DAS based on the generated A-local DAS information is available, and
wherein the control information includes analyzed-integrated (A-integrated) DAS information if the DAS based on the generated A-local DAS information is not available,
wherein the A-integrated DAS information is generated by analyzing integrated DAS information generated in a broad DAS server based on analyzed-local (A-local) DAS information generated by analyzing the local DAS information and broad DAS information within the broad DAS server,
wherein the local DAS server is located out of a vehicle and receives the local DAS information from each of at least one vehicle terminal within a coverage of the local DAS server.

36. The local DAS terminal of claim 35,
wherein the DAS includes a safety connection service which provides information on safe driving of the vehicle, and
wherein the local DAS information includes vehicle safety information relating to the safe driving of the vehicle.

37. The local DAS terminal of claim 35,
wherein the DAS includes a navigation service using the communication network, and
wherein the local DAS information includes driving information of the vehicle.

38. The local DAS terminal of claim 35,
wherein the DAS includes a black box service using the communication network, and
wherein the local DAS information includes driving information of the vehicle.

39. The local DAS terminal of claim 35,
wherein the DAS includes a remote driving service using the communication network, and
wherein the local DAS information includes driving information of the vehicle.

40. The local DAS terminal of claim 35,
wherein the DAS includes a charging service using the communication network, and
wherein the local DAS information includes charging state information of the vehicle.

41. A non-transitory computer-readable storage medium storing instructions that, when executed, cause at least one processor to perform the method of claim 1.

* * * * *